May 25, 1948.     L. COHEN     2,442,265
AIRCRAFT BANK INDICATOR
Filed July 7, 1944
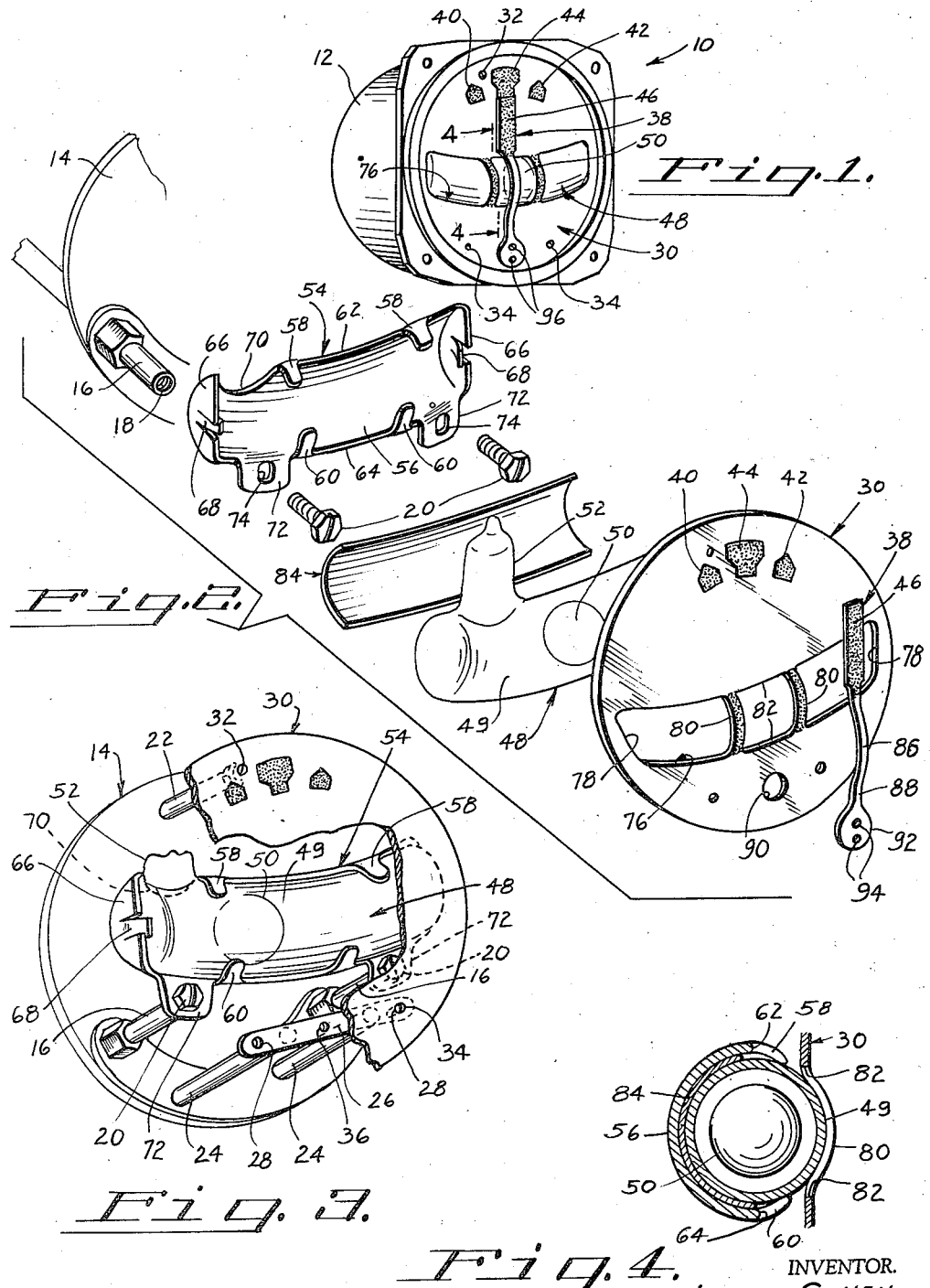
INVENTOR.
LOUIS COHEN
BY Edwin Lensohn
ATTORNEY Patented May 25, 1948

2,442,265

UNITED STATES PATENT OFFICE 2,442,265

AIRCRAFT BANK INDICATOR

Louis Cohen, New York, N. Y., assignor to Longines-Wittnauer Watch Co. Inc., New York, N. Y., a corporation of New York Application July 7, 1944, Serial No. 543,772

2 Claims. (Cl. 33—206)

This invention relates to aircraft instruments and more particularly to an instrument comprising an aircraft bank-indicator.

One object of the present invention is the provision of an instrument of the type described, with improved means for supporting a liquid-level of the curved tube type.

Another object of the invention is the construction and arrangement of the support for the liquid level whereby to facilitate the mounting and assembly of the curved liquid level in the instrument in the proper relation to other parts thereof.

A further object of the invention is the provision of an improved dial construction in combination with the liquid-level of the bank-indicator.

The above and other objects of the invention will be fully understood from the following description considered in connection with the accompanying illustrative drawings.

In the drawings:

Fig. 1 is a perspective view of an aircraft instrument embodying the present invention;

Fig. 2 is a perspective view of parts of the instrument separated from each other but disposed in related positions;

Fig. 3 is a perspective view of parts of the instrument, a portion of the dial being cut away for the purpose of illustration;

Fig. 4 is a sectional view, on the line 4—4 of Fig. 1, of the holder, of the liquid level mounted therein and of the dial.

Referring now to the drawings in detail, the instrument 10 illustrated in Fig. 1 comprises a casing 12 within which is mounted a frame for supporting the various parts of the instrument, said frame including a plate 14 having fixed thereto and projecting forwardly thereof a pair of laterally spaced posts 16 which are internally threaded as indicated at 18 in Fig. 2 for reception of the fastening screws 20. The plate-frame 14 also has fixed thereto and projecting forwardly thereof a post 22 and a pair of laterally spaced posts 24, said last mentioned posts having fixed thereto a cross strap 26 provided with threaded openings 28. The dial plate 30 is secured to post 22 and to cross strap 26 by screws 32 and 34, respectively. Said cross strap 26 is also provided with a bearing opening 36 for the usual stem (not shown) which operates the pointer 38 of the turn indicator which is customarily provided in an instrument of this type in conjunction with the bank-indicator.

As illustrated, the dial plate 30 carries the usual left, right, and center dial markings 40, 42 and 44, respectively, said markings being formed of luminescent material. The outer end portion 46 of the pointer 38 is also provided with luminescent material.

The bank-indicator comprises a liquid-level 48 constituted by a longitudinally curved transparent tube 49 which as usual has therein a suitable transparent or translucent liquid and a ball 50. Said tube is provided as here shown with a lateral chamber-forming part 52, the liquid in said tube filling the latter and part of said chamber.

An important feature of the present invention resides in the construction of the means for supporting the liquid-level in the instrument. Said supporting means comprises a holder 54 which is curved longitudinally to correspond to the longitudinal curvature of the liquid-level tube 49 which fits in said holder. More particularly, holder 54 comprises a longitudinally curved concave wall 56 having a transverse curvature corresponding to the transverse circular curvature of the tube 49. Holder 54 is preferably formed of aluminum or other suitable sheet metal, and is provided with integral bendable tabs 58 and 60 which project from the laterally spaced longitudinal edges 62 and 64, respectively, of wall 56 and which are bent over the tube 49, after the latter is inserted in the holder, for retaining the liquid-level therein. The holder 54 is also provided with integral end walls 66 provided optionally but preferably with struck-out resilient portions 68 which engage the opposite ends, respectively, of the longitudinally curved tube 49 of the liquid-level tube for holding the latter against movement longitudinally of holder 54. A recess 70 is formed in the edge 62 of the holder to receive the chamber-forming part 52 when the liquid-level is mounted in the holder. Integral apertured ears 72 are formed at the edge 64 of the holder for securing the latter to the posts 16, the fastening screws 20 passing through the apertures 74 in said ears and engaging the posts 16 in the threaded openings 18 thereof.

It will be noted that the holder 54 is open at the front thereof and that the tube of the liquid level projects forwardly of the front longitudinal edges 62 and 64 of the arcuate wall 56. The dial plate 30 is provided with a longitudinally curved slot 76 through which the tube 49 of the liquid-level partially projects forwardly of the plane of the dial plate 30, as shown in Figs. 1 and 4. More specifically, as illustrated in Fig. 4, when the liquid-level 48 is mounted in the holder 54 and the dial plate 30 is in position, a peripherally extending portion of tube 49 of the liquid-level projects through slot 76 forwardly of said dial plate. The length of the slot 76 is substantially the same as the length of the curved tube of the liquid-level so that the opposite ends 78 of said slot lie adjacent the opposite ends, respectively, of the liquid level tube. Forwardly curved arcuate strips 80 formed integrally with the dial plate extend across slot 76 of dial plate 30 between the opposite ends of said slot centrally thereof. Said cross strips 80 are in laterally spaced relation and define with the intermediate portions 82 of said slot an opening forming the zero indication of the bank-indicator. It will be understood that in the non-banked flight condition of the aircraft, the ball 50 in the liquid-level tube 49 is positioned centrally of said tube and in that position is located centrally of slot 76 in registry with the space between cross strips 80, and that when the aircraft is banked, said ball moves longitudinally of the tube 49 in either direction from its central position according to the direction of the banking. The outer surfaces of cross strips 80 of dial plate 30 are preferably provided with a coating of luminescent material. A strip of paper or other suitable material 84 carrying luminescent material is positioned in the holder 54 between the arcuate wall 56 thereof and the adjacent portion of the tube of the liquid level.

It will be noted that the pointer 38 of the turn indicator has a curved intermediate part 86 between the end portion 46 and the opposite end portion 88 so that said end portions can lie relatively close to the dial plate and move over the dial without interference by the projecting part of the liquid-level or by the forwardly curved strips 80 of the dial plate. As shown in Fig. 2, dial plate 30 is provided with an opening 90 to receive the end portion of the pointer-operating stem, said pointer having a portion 92 provided with openings 94 for the screws 96 (Fig. 1) which fasten said pointer to said end portion of the operating stem (not shown).

Thus, it is seen that the above described construction and arrangement are well adapted to accomplish the several objects of the present invention. It will be understood, however, that while I have shown and described the presently preferred embodiment of my invention, the latter may be embodied otherwise than as herein specifically illustrated or described, and that in the illustrated embodiment certain changes in the details of construction and in the arrangement of parts may be made without departing from the underlying principles of the invention within the scope of the appended claims.

Having thus described my invention, what I claim and desire to secure by Letters Patent is:

1. A support for a longitudinally curved level tube of an aircraft bank-indicating instrument, comprising a holder for said tube comprising an open-front longitudinally curved member comprising a longitudinally extending concave wall terminating in transversely spaced longitudinally extending edges conforming to the longitudinal curvature of said member and positioned at said open front thereof whereby said level-tube is insertable in said holder through said open front thereof, and tabs integral with said holder and projecting from said edges of said wall for engagement with said tube to retain the latter in said holder.

2. In an aircraft bank-indicator of the type which is provided with a longitudinally curved level-tube, a holder for said tube comprising an open-front longitudinally curved member comprising a longitudinally extending concave wall terminating in transversely spaced longitudinally extending edges conforming to the longitudinal curvature of said member and positioned at said open front thereof whereby said level-tube is insertable in said holder through said open front thereof, said tube having a lateral chamber-forming part and said holder having a recess in which said chamber-forming part of the tube is positioned.

LOUIS COHEN.

REFERENCES CITED

The following references are of record in the file of this patent:

UNITED STATES PATENTS

| Number | Name | Date |
|---|---|---|
| 970,729 | Lingle | Sept. 20, 1910 |
| 1,318,162 | Loring | Oct. 7, 1919 |
| 1,738,791 | Ober | Dec. 10, 1929 |
| 1,842,824 | Colvin et al. | Jan. 26, 1932 |
| 2,142,516 | Koster | Jan. 3, 1939 |
| 2,189,375 | Sylvander | Feb. 6, 1940 |
| 2,362,872 | Weagle | Nov. 14, 1944 |
| 2,380,079 | Schwein | July 10, 1945 |